United States Patent [19]

Lapp

[11] Patent Number: 5,459,109
[45] Date of Patent: Oct. 17, 1995

[54] SUBSTRATE GLASSES FOR PLASMA DISPLAYS

[75] Inventor: Josef C. Lapp, Corning, N.Y.

[73] Assignee: Corning Incorporated, Corning, N.Y.

[21] Appl. No.: 308,144

[22] Filed: Sep. 19, 1994

[51] Int. Cl.⁶ .......................... C03C 3/064; C03C 3/091
[52] U.S. Cl. ................. 501/66; 501/69; 501/70; 501/77
[58] Field of Search .................. 501/66, 69, 70, 501/77

[56] References Cited

U.S. PATENT DOCUMENTS

| | | |
|---|---|---|
| 4,409,337 | 10/1983 | Dumbaugh, Jr. . |
| 4,824,808 | 4/1989 | Dumbaugh, Jr. . |
| 4,994,415 | 2/1991 | Imai et al. . |
| 5,326,730 | 7/1994 | Dumbaugh, Jr. et al. . |
| 5,374,595 | 12/1994 | Dumbaugh, Jr. et al. ............. 501/66 |

FOREIGN PATENT DOCUMENTS

| | | |
|---|---|---|
| 0510543 | 10/1992 | European Pat. Off. . |
| 0559389 | 9/1993 | European Pat. Off. . |
| 0576362 | 12/1993 | European Pat. Off. . |

*Primary Examiner*—Karl Group
*Attorney, Agent, or Firm*—Clinton S. Janes, Jr.

[57] ABSTRACT

This invention relates to glasses especially suitable for use as substrates in plasma display panels, the glasses being essentially free from alkali metal oxides and consisting essentially, in weight percent, of

| | | | |
|---|---|---|---|
| $SiO_2$ | 39–43 | CaO | 0–2.5 |
| $Al_2O_3$ | 2.5–9.5 | SrO | 10.5–21.5 |
| $B_2O_3$ | 1.5–4.5 | BaO | 25.5–39 |
| MgO | 0–1.5 | MgO + CaO + SrO +BaO | 45.5–52.5 |
| | | Fining Agents | 0–1.5. |

4 Claims, No Drawings

SUBSTRATE GLASSES FOR PLASMA DISPLAYS

FIELD OF THE INVENTION

This invention relates to the development of a family of alkali metal oxide-free glass compositions suitable for use in plasma display panels (PDPs).

BACKGROUND OF THE INVENTION

PDPs belong to a broad classification of displays known as vacuum fluorescent displays. The mechanism underlying their operation is quite similar to that operating in fluorescent lighting. That is, an electrical discharge is initiated in a gas mixture (Penning gas) at low pressure, this discharge ionizing the gas atoms releasing ultraviolet radiation which strikes a phosphor emitting visible light. Where color is desired, phosphors which emit red, blue, and green light upon being struck by the ultraviolet energy are used.

Plasma displays can be classified broadly into one of three types, depending upon the type of voltage utilized to address the display. Thus, there are DC displays, AC displays, and hybrid displays, the last type comprising a AC-DC mode of display. Each type exhibits its own advantages and disadvantages; for example, the ease of manufacture (DC type) or improved efficiency (AC type). The principal substantive difference between those displays resides in the method by which the current is limited to prevent arcing of the Penning gas. In the DC panel this is accomplished through the incorporation of an external resistor in series with the anode. In the AC and hybrid display panels a thin dielectric glass layer is applied as a coating on both electrodes.

A typical PDP panel is composed of two flat glass sheets, customarily having a thickness of about 2–3 mm and spaced about 100–150 μm apart. Barrier ribs, commonly consisting of a glass frit, define this gap as well as the individual subpixels. The electrodes are located on the interior surface of these glass sheets. In the simplest case the electrodes are orthogonally directed between the top and bottom substrate glass. Typical electrode materials include Cu/Cr and Ag which are applied as a paste frit.

Covering the electrodes in either the AC or AC-DC hybrid type of display panel is an appropriately doped dielectric glass frit (which is highly reflective when applied on the back surface and highly transparent layer when applied on the front) which, in turn, is covered with a sputtered MgO layer. This latter layer serves both as a protector of the underlying layers and a low energy source of electrons which assist in sustaining the plasma. A final layer is put in place which comprises an appropriate fluorescent material applied over the MgO.

Soda lime glass sheet formed by means of the float process has, to date, been the principal choice as the substrate material, largely on the basis of its availability. As the resolution demands of the display have increased, however, PDP manufacturers are finding this glass to be less than optimal. For example, going from a monochrome display to color requires greater than a fourfold increase in resolution as four subpixels, one blue, one red, and two green comprise the same area as one monochrome pixel. Changes in the dimensions and flatness of the glass during the multiple firings required in the display fabrication lead to variations in cell gap width which, in turn, may lead to variations in the electrical characteristics of the cell, resulting in color variations or, in the extreme case, to dead pixels.

Laboratory work and manufacturing experience have indicated that a good initial measure of the thermal stability of a glass is provided by its strain point. The typical soda lime glass exhibits a strain point in the vicinity of 530° C. The multiple firings discussed above are carried out at temperatures in the range of 500°–585° C.; that is, temperatures which can be above the strain point of the soda lime glass. It has been estimated that, to maintain sufficient stability during those firings, the strain point of the substrate must necessarily be higher than 600° C.

A second critical property requirement of the glass substrate is an appropriate coefficient of thermal expansion. The coefficient exhibited by the glass must be compatible with those of the low firing temperature frits utilized for the edge seal, the rib structure, and the dielectric layers (in the AC and AC-DC hybrid displays). Most of the currently employed frits have been developed to be compatible with soda lime glass whose linear coefficient of thermal expansion over the temperature range of 0°–300° C. is approximately $85 \times 10^{-7}$/°C. One example of such a frit commercially used in color PDPs is Corning Code 7599 frit marketed by Corning Incorporated, Corning, N.Y., which has a linear coefficient of thermal expansion (0°–300° C.) of $89 \times 10^{-7}$/°C. and is conventionally fired at temperatures of about 580°–585° C. Generally, the coefficient of expansion and the firing temperature of a frit are inversely related; that is, the lower the coefficient of thermal expansion, the higher the required firing temperature. Accordingly, to maintain a sufficiently low firing temperature, it is desirable to utilize a substrate glass demonstrating a linear coefficient of thermal expansion (0°–300° C.) greater than $70 \times 10^{-7}$/°C., but less than $90 \times 10^{-7}$/°C., and, preferably in the range of $79-85 \times 10^{-7}$/°C.

A third vital property which the glass substrate must possess is a compatibility with a sheet forming process for glasses. The most widely used sheet forming processes include rolling, slot drawing, float, and overflow downdraw. Float is currently the process of choice to fabricate sheet operable in PDPs because of its inherent economy in large scale production and its ability to provide a sufficiently flat and smooth substrate. Three critical properties required in glass compositions to render them operable in the float process have recently been enumerated in the following three European Patent Applications: 510,543, 559,389, and 576,362. Those properties are: (1) a sufficiently low melting temperature to assure good melting performance and glass homogeneity; (2) a 1000 MPas (10,000 poises) isokom temperature, which temperature corresponds to delivery of the molten glass onto the float bath, of less than 1240° C.; and (3) a viscosity at the liquidus temperature greater than 300 MPas (3000 poises).

Accordingly, the primary objective of the present invention was to develop glass compositions exhibiting strain points higher than 600° C., linear coefficients of thermal expansion over the temperature range of 0°–300° C. between $70-90 \times 10^{-7}$/°C., 1000 MPas isokom temperatures below 1240° C., and viscosities at the liquidus temperature greater than 300 MPas.

A second objective of the subject invention was to devise glass compositions especially suitable for use as substrates in plasma display panels.

SUMMARY OF THE INVENTION

Those objectives can be achieved in glasses consisting essentially, expressed in terms of weight percent on the oxide basis, of

| $SiO_2$ | 39–43 | CaO | 0–2.5 |
|---|---|---|---|
| $Al_2O_3$ | 2.5–9.5 | SrO | 10.5–21.5 |
| $B_2O_3$ | 1.5–4.5 | BaO | 25.5–39. |
| MgO | 0–1.5 | MgO + CaO + SrO + BaO | 45.5–52.5 |
| | | Fining Agents | 0–1.5 |

Although it is not mathematically possible to convert ranges in weight percent to exact ranges in cation percent, the following values represent approximations of the inventive glass compositions expressed in terms of cation percent on the oxide basis.

| $SiO_2$ | 52–57 | CaO | 0–3 |
|---|---|---|---|
| $Al_2O_3$ | 4–14.5 | SrO | 8–16 |
| $B_2O_3$ | 4–10 | BaO | 12–20.5 |
| MgO | 0–2 | MgO + CaO + SrO + BaO | 17–33.5 |
| | | Fining Agents | 0–1.5 |

Because of the adverse effect alkali metals can have upon electrical properties of the deposited electrode and dielectric materials, the glass compositions will be essentially free from alkali metal oxides. As employed herein, the expression "essentially free from" means that the glass does not contain sufficient alkali metal oxide content to alter the chemical and/or physical characteristics of the glass. Preferably, alkali metal oxides will be totally absent, but this is not always possible because batch materials frequently contain alkali metals as impurities.

Strict observance of the above composition intervals has been found to be necessary to assure the preparation of glasses exhibiting the desired chemical and physical properties. To illustrate:

At least 39% $SiO_2$ must be present to secure a strain point above 600° C. and to impart good chemical durability to the glass. Concentrations in excess of 43%, however, lead to undesirable increases in the melting temperature of the glasses.

Control of the $Al_2O_3$ concentrations is essential for securing and maintaining the lowest possible liquidus temperature. Levels less than 2.5% or greater than 9.5% lead to rapid elevations in liquidus temperature to values in excess of 1240° C., corresponding to melt viscosities less than 300 MPas. Such low viscosities of the melt are incompatible with precision sheet glass forming processes.

$B_2O_3$ is useful in improving the viscosity character of the glass, making it easier to process. The inclusion of $B_2O_3$ acts to reduce the liquidus temperature of the glass. Thus, glasses containing less than 1.5% $B_2O_3$ exhibit liquidus temperatures in excess of 1240° C. Nevertheless, the level of $B_2O_3$ should not exceed 4.5% in order to avoid an undesirable lowering of the strain point of the glass.

The alkaline earth metal oxides modify the melting and physical properties of the glass. The total thereof must be at least 45.5% to impart the required high thermal expansion to the inventive glasses, but must not exceed 52.5% to avoid serious reduction in the strain point of the glass. The alkaline earth metal oxides will preferably be included as SrO and BaO, inasmuch as these oxides demonstrate the greatest capability of raising the coefficient of thermal expansion.

Most preferably, those two oxides will be incorporated in roughly equivalent amounts on a cation percent basis to achieve the lowest liquidus temperature. Therefore, to provide that desired approximate equivalency, the concentration of SrO will range about 10.5–21.5% by weight and that of BaO will range about 25.5–39% by weight. Whereas MgO and CaO, when present at low levels, exert the beneficial effect of reducing the liquidus temperature, their inclusion must be limited to 1.5% by weight and 2.5% by weight, respectively, in order to avoid deleteriously lowering the coefficient of thermal expansion of the glass.

Although much of a fining agent is lost through volatilization during melting and refining, a small amount is customarily retained in the glass. Accordingly, an amount of about 1.5% by weight has been deemed a practical maximum to achieve satisfactory fining, while not leaving a quantity of residue having the potential for altering the desired glass properties.

In addition to the components specifically discussed above, various optional ingredients may be included which can modify the properties of the base glass. Such ingredients include, for example, $La_2O_3$, $Nb_2O_5$, $Ta_2O_5$, $TiO_2$, $Y_2O_3$, ZnO, and $ZrO_2$. The total of all such additions will not exceed about 10%, with 5% comprising a maximum for individual components.

PRIOR ART

U.S. Pat. No. 4,409,377 (Dumbaugh, Jr.) is directed to glasses suitable for use as envelopes in tungsten-halogen lamps, the glasses consisting essentially, in weight percent on the oxide basis, of

| $SiO_2$ | 56–59 | MgO | 5.5–6.25 |
|---|---|---|---|
| $Al_2O_3$ | 16–17 | BaO | 5–9 |
| $B_2O_3$ | 4.5–5.25 | SrO | 0–3. |
| CaO | 7.5–9.25 | | |

Whereas the glasses consisted of the same seven basic components as are contained in the subject inventive glasses, the concentrations thereof are far removed from those of the parent inventive glasses.

U.S. Pat. No. 4,824,808 (Dumbaugh, Jr.) is drawn to glasses suitable for glass substrates to be used in liquid crystal display devices, the glasses consisting essentially, in weight percent on the oxide basis, of

| $SiO_2$ | 52–58 | SrO | 0–6 |
|---|---|---|---|
| $Al_2O_3$ | 12.5–18 | BaO | 1–9 |
| $B_2O_3$ | 20–23 | ZnO | 0–3 |
| CaO | 0–6 | Fining Agents | 0–1. |
| MgO | 0–4 | | |

Again, the glasses were composed of the same basic constituents as are contained in the subject inventive glasses, but the levels thereof are quite different from those included in the present inventive glasses.

U.S. Pat. No. 4,994,415 (Imai et al.) is also drawn to glasses suitable for glass substrates to be used in liquid crystal display devices, the glasses consisting essentially, in weight percent on the oxide basis, of

| $SiO_2$ | 52–60 | BaO | 10–22 |

-continued

| | | | |
|---|---|---|---|
| Al₂O₃ | 7–14 | SrO | 0–10 |
| B₂O₃ | 3–12 | ZnO | 0–10. |
| CaO | 3–13 | | |

Again, the glasses contained the necessary base components as are included in the subject inventive glass, but also again, the concentrations thereof are quite removed from those of the present inventive glasses.

U.S. Pat. No. 5,326,730 (Dumbaugh, Jr. et al.) is also concerned with glasses designed for use as substrates in liquid crystal display devices, the glasses consisting essentially, in mole percent on the oxide basis, of

| | | | |
|---|---|---|---|
| SiO₂ | 65–76 | SrO | 0–10 |
| Al₂O₃ | 7–11 | MgO + CaO + SrO | 0–15 |
| B₂O₃ | 0–5 | ZrO₂ | 0–2.5 |
| BaO | 12–19 | TiO₂ | 0–3 |
| MgO | 0–5 | Ta₂O₅ | 0–3 |
| CaO | 0–10 | ZrO₂ + TiO₂ + Ta₂O₅ | 0.5–5. |

Not only is the SiO₂ content in excess of that permitted in the subject inventive glasses and the SrO content too low, but also at least one of ZrO₂, TiO₂, and Ta₂O₅ must be present.

U.S. application Ser. No. 08/155,483, filed Nov. 22, 1993 by W. H. Dumbaugh, Jr., J. C. Lapp, and D. M. Moffatt under the title HIGH LIQUIDUS VISCOSITY GLASSES FOR FLAT PANEL DISPLAYS, discloses glasses consisting essentially, in mole percent on the oxide basis, of

| | | | |
|---|---|---|---|
| SiO₂ | 64–70 | Y₂O₃ | 0–5 |
| Al₂O₃ | 9.5–14 | MgO | 0–5 |
| B₂O₃ | 5–10 | CaO | 3–13 |
| TiO₂ | 0–5 | SrO | 0–5.5 |
| Ta₂O₅ | 0–5 | BaO | 2–7 |
| Nb₂O₅ | 0–5 | MgO + CaO + SrO + BaO | 10–20. |

The concentrations of SiO and Al₂O₃ exceed those permitted in the subject inventive glasses, and those of BaO are less than the minimum required in the present inventive glasses.

U.S. application Ser. No. 08/288,300, filed Aug. 10, 1994 by D. M. Moffatt and D. V. Neubauer under the title FLAT PANEL DISPLAY, describes glasses consisting essentially, in weight percent on the oxide basis, of

| | | | |
|---|---|---|---|
| SiO₂ | 49–67 | CaO | 0–18 |
| Al₂O₃ | 6–23 | SrO | 0–15 |
| SiO₂ + Al₂O₃ | >68 | BaO | 0–21 |
| B₂O₃ | 0–15 | MgO + CaO + SrO + BaO | 12–30. |
| MgO | 0–8 | | |

The levels of SrO are above the maximum required in the subject inventive glasses and those of BaO are below the minimum required in the present inventive glasses.

European Patent Application No. 510,543 records glasses consisting essentially, in weight percent on the oxide basis, of

| | | | |
|---|---|---|---|
| SiO₂ | 50–60 | CaO | 0–7 |
| Al₂O₃ | 8–16 | SrO | 0–10 |
| B₂O₃ | 4–10 | BaO | 10–20 |
| MgO | 1.5–5 | ZnO | 0–3. |

The SiO₂ and BaO contents are outside the composition intervals demanded in the subject inventive glasses.

European Patent Application No. 559,389 reports glasses free of SrO and ZnO consisting essentially, in mole percent on the oxide basis, of

| | | | |
|---|---|---|---|
| SiO₂ | 60–63 | BaO | 3–9 |
| Al₂O₃ | 9.5–12 | MgO + CaO + BaO | 16–19 |
| SiO₂ + Al₂O₃ | 70.5–73 | TiO₂ | 0–1 |
| MgO | 3–13 | P₂O₅ | 0–1 |
| CaO | 0–8 | Fe₂O₃ | 0–0.2. |

The required absence of SrO immediately places the glasses outside of the subject inventive glasses. In addition, the levels of SiO₂ and B₂O₃ exceed the maximum of each permitted in the subject inventive glasses and the levels of BaO are too low.

European Patent Application No. 576,362 discloses glasses consisting essentially, in cation percent on the oxide basis, of

| | | | |
|---|---|---|---|
| SiO₂ | 46–56 | TiO₂ | 0–3 |
| Al₂O₃ | 12–17 | SrO | 2–7 |
| B₂O₃ | 10–23 | BaO | 0–4 |
| CaO | 9–15 | Na₂O + K₂O | ≦0.5. |
| MgO | 0.5–4 | | |

The CaO, SrO, and BaO contents are outside the composition intervals demanded in the subject inventive glasses.

DESCRIPTION OF PREFERRED EMBODIMENTS

Table I records a group of glass compositions illustrative of the present invention expressed in terms of parts by weight on the oxide basis. Because the sum of the components totals or closely approximates 100, for all practical purposes the values of the individual components may be deemed to represent weight percent. The ingredients utilized in compounding the batches are listed below.

| | | | |
|---|---|---|---|
| Sand | SrCO₃ | Limestone | BaCl₂ |
| Al₂O₃ | BaCO₃ | MgO | BaF₂ |
| H₃BO₃ | Ba(NO₃)₂ | As₂O₅ | |

Nevertheless, it will be understood that those materials are illustrative only. It is only necessary that the materials employed, when melted together, will be converted into the desired oxide in the proper proportions.

The batch ingredients were compounded in batches ranging in weight from 1000–5000 grams, the batch materials ballmilled together to assist in securing a homogeneous melt, and the batches then charged into platinum crucibles. The crucibles were moved into a furnace operating at about 1500°–1600° C. and the batches melted for about 16 hours. Thereafter, the melts were poured onto a steel table to produce glass slabs having the following dimensions 25.4–76.2 cm×12.7–38.1 cm×1.27 cm (10–30"×5–15"× 0.5"), and those slabs were transferred immediately to annealers operating in the range of 675°–775° C. $As_2O_5$ performed its customary function as a fining agent.

Whereas the above description reflects work performed in the laboratory, it will be recognized that the inventive glasses are capable of being melted in large scale melting units and shaped into articles of desired configurations employing techniques conventional in the glass art. That is, in accordance with standard glass melting and forming practice, it is only necessary that the batch materials be mixed together thoroughly, that batch melted at temperatures and for times sufficient to produce a homogeneous melt, that melt cooled and simultaneously shaped into a glass article of a desired geometry, and that glass article normally annealed.

Table I also reports several physical properties determined on the glasses employing measuring techniques conventional in the glass art. Those determinations included softening points (S.P.), annealing points (A.P.), and strain points (St.P.) expressed in terms of °C., linear coefficients of thermal expansion (Exp.) expressed in terms of $\times 10^{-7}/°C.$, and density (Den.) expressed in terms of grams/cm$^3$. The internal liquidus (Liq.) expressed in terms of °C. was determined via the gradient boat method. The high temperature viscosities listed in Table II corresponding to 20 MPas (200 poises) and 1000 MPas (10,000 poises), reported as Melt and Work, respectively, were measured using a rotational cylinders apparatus, as were the viscosities corresponding to the internal liquidus (Liq.Vis.).

TABLE I

|  | 1 | 2 | 3 | 4 | 5 | 6 | 7 |
|---|---|---|---|---|---|---|---|
| $SiO_2$ | 42.8 | 41.9 | 41.1 | 40.3 | 42.5 | 39.7 | 41.3 |
| $Al_2O_3$ | 9.46 | 7.96 | 6.53 | 5.15 | 5.24 | 7.83 | 5.27 |
| $B_2O_3$ | 1.82 | 1.78 | 1.75 | 1.71 | 1.74 | 1.75 | 2.63 |
| SrO | 18.4 | 19.4 | 20.3 | 21.2 | 20.3 | 20.3 | 20.4 |
| BaO | 27.2 | 28.7 | 30 | 31.3 | 30 | 30.1 | 30.2 |
| $As_2O_3$ | 0.8 | 0.8 | 0.8 | 0.8 | 0.8 | 0.8 | 0.8 |
| S.P. | 872 | 860 | 847 | 840 | 844 | 854 | 833 |
| A.P. | 699 | 696 | 689 | 686 | 685 | 694 | 679 |
| St.P. | 653 | 655 | 648 | 646 | 644 | 651 | 638 |
| Exp. | 73.5 | 76.9 | 80.9 | 84.2 | 81 | 79.7 | 81.5 |
| Den. | — | 3.429 | 3.5 | 3.564 | 3.488 | 3.505 | 3.504 |
| Liq. | 1195 | 1110 | 1135 | 1145 | 1145 | 1155 | 1115 |

|  | 8 | 9 | 10 | 11 | 12 | 13 | 14 |
|---|---|---|---|---|---|---|---|
| $SiO_2$ | 41.5 | 41.2 | 42.2 | 42.1 | 42.9 | 42.3 | 41.8 |
| $Al_2O_3$ | 4 | 8.63 | 8.83 | 8.81 | 8.98 | 5.4 | 4.04 |
| $B_2O_3$ | 3.53 | 1.79 | 1.83 | 1.82 | 1.86 | 3.6 | 3.56 |
| MgO | — | — | 1.06 | 0.528 | 0.538 | — | — |
| CaO | — | — | — | 0.734 | 2.25 | — | 0.717 |
| SrO | 20.5 | 19.4 | 18.5 | 18.4 | 17.4 | 19.5 | 20 |
| BaO | 30.3 | 28.7 | 27.4 | 27.3 | 25.8 | 28.9 | 29.6 |
| $As_2O_3$ | 0.8 | 0.8 | 0.8 | 0.8 | 0.8 | 1.1 | 1.1 |
| S.P. | 817 | 860 | 865 | 865 | 866 | 816 | 826 |
| A.P. | 671 | 698 | 698 | 698 | 698 | 669 | 677 |
| St.P. | 633 | 655 | 655 | 655 | 655 | 630 | 637 |
| Exp. | 82.3 | 76.1 | 73.7 | 74.3 | 73.3 | 81 | 78.4 |
| Den. | 3.519 | 3.436 | 3.381 | 3.384 | 3.339 | 3.489 | 3.444 |
| Liq. | 1090 | 1195 | 1180 | 1180 | 1175 | 1080 | 1055 |

|  | 15 | 16 | 17 | 18 | 19 | 20 | 21 |
|---|---|---|---|---|---|---|---|
| $SiO_2$ | 42.2 | 42.1 | 42.7 | 41.5 | 41.6 | 42.3 | 42.6 |
| $Al_2O_3$ | 4.08 | 3.99 | 3.98 | 3.36 | 2.72 | 4.74 | 4.41 |
| $B_2O_3$ | 3.59 | 3.08 | 2.63 | 3.97 | 4.43 | 3.59 | 3.59 |
| CaO | 1.45 | — | — | — | — | 0.724 | 0.723 |
| SrO | 19.5 | 20.4 | 20.3 | 20.5 | 20.6 | 19.5 | 19.5 |
| BaO | 28.9 | 30.2 | 30.1 | 30.3 | 30.4 | 28.9 | 28.9 |
| $As_2O_3$ | 1.1 | 1.1 | 1.1 | 1.1 | 1.1 | 1.1 | 1.1 |
| S.P. | 819 | 821 | 828 | 810 | 807 | — | — |
| A.P. | 674 | 676 | 678 | 670 | 667 | 667 | 667 |
| St.P. | 637 | 638 | 639 | 635 | 631 | 629 | 629 |

TABLE I-continued

| Exp. | 81.5 | 81.5 | 81.9 | 82.3 | 82.4 | 78.1 | 79.9 |
|---|---|---|---|---|---|---|---|
| Den. | 3.469 | 3.506 | 3.494 | 3.516 | 3.517 | — | — |
| Liq. | 1065 | 1105 | 1110 | 1085 | 1075 | 1050 | 1055 |

|  | 22 | 23 | 24 | 25 | 26 | 27 | 28 |
|---|---|---|---|---|---|---|---|
| $SiO_2$ | 41.9 | 42.2 | 42.3 | 42.1 | 42.5 | 42.1 | 42.5 |
| $Al_2O_3$ | 5.07 | 5.06 | 4.41 | 4.39 | 4.76 | 4.72 | 5.09 |
| $B_2O_3$ | 3.6 | 3.37 | 3.82 | 3.58 | 3.61 | 3.58 | 3.61 |
| CaO | 0.724 | 0.723 | 0.725 | 0.72 | 1.09 | 0.38 | 0.73 |
| SrO | 19.5 | 19.5 | 19.5 | 19.8 | 19.3 | 19.8 | 19.4 |
| BaO | 28.9 | 28.9 | 28.9 | 29.2 | 28.5 | 29.3 | 28.5 |
| $As_2O_3$ | 1.1 | 1.1 | 1.1 | 1.1 | 1.1 | 1.1 | 1.1 |
| A.P. | 670 | 670 | 6755 | 665 | 668 | 669 | 667 |
| St.P. | 633 | 631 | 627 | 628 | 630 | 630 | 629 |
| Exp. | 79.4 | 78.4 | 78.5 | 78.9 | 78.4 | 79.7 | 78.4 |
| Liq. | 1065 | 1050 | 1040 | 1065 | 1050 | 1055 | 1060 |

|  | 29 | 30 | 31 | 32 | 33 | 34 | 35 | 36 |
|---|---|---|---|---|---|---|---|---|
| $SiO_2$ | 42.2 | 42 | 42.2 | 42 | 41.4 | 40.9 | 42 | 41.7 |
| $Al_2O_3$ | 5.06 | 5.03 | 5.06 | 5.03 | 4.97 | 4.9 | 5.03 | 5 |
| $B_2O_3$ | 3.59 | 3.57 | 3.59 | 3.57 | 3.52 | 3.48 | 3.57 | 3.55 |
| CaO | 0.36 | — | 0.72 | 0.72 | 0.71 | 0.7 | 0.36 | 0.36 |
| SrO | 19.2 | 19.1 | 17.9 | 16.5 | 13.6 | 10.9 | 17.8 | 16.4 |
| BaO | 29.3 | 30.1 | 30.2 | 32 | 35.5 | 38.9 | 31 | 32.8 |
| $As_2O_3$ | 1.1 | 1.1 | 1.1 | 1.1 | 1.1 | 1.1 | 1.1 | 1.1 |
| A.P. | 667 | 667 | 666 | 666 | 665 | 663 | 665 | 665 |
| St.P. | 629 | 629 | 629 | 629 | 626 | 625 | 626 | 627 |
| Exp. | 78.9 | 79.5 | 78.4 | 78.8 | 79.6 | 79.5 | 78.5 | 79.1 |
| Liq. | 1050 | 1055 | 1035 | 1055 | 1075 | 1090 | 1060 | 1060 |

Table IA reports the same glass compositions, but expressed in terms of cation percent on the oxide basis.

TABLE IA

|  | 1 | 2 | 3 | 4 | 5 | 6 | 7 |
|---|---|---|---|---|---|---|---|
| $SiO_2$ | 54.5 | 54.5 | 54.5 | 54.5 | 56.5 | 52.5 | 54.5 |
| $AlO_{1.5}$ | 14.2 | 12.2 | 10.2 | 8.2 | 8.2 | 12.2 | 8.2 |
| $BO_{1.5}$ | 4 | 4 | 4 | 4 | 4 | 4 | 6 |
| SrO | 13.6 | 14.6 | 15.6 | 16.6 | 15.6 | 15.6 | 15.6 |
| BaO | 13.6 | 14.6 | 15.6 | 16.6 | 15.6 | 15.6 | 15.6 |

|  | 8 | 9 | 10 | 11 | 12 | 13 | 14 |
|---|---|---|---|---|---|---|---|
| $SiO_2$ | 54.5 | 54.5 | 53.5 | 53.5 | 53.5 | 54.5 | 54.5 |
| $AlO_{1.5}$ | 6.2 | 13.2 | 13.2 | 13.2 | 13.2 | 8.2 | 6.2 |
| $BO_{1.5}$ | 8 | 4 | 4 | 4 | 4 | 8 | 8 |
| MgO | — | 2 | 1 | 1 | — | — | — |
| CaO | — | — | 1 | 3 | — | — | 1 |
| SrO | 15.6 | 14.6 | 13.6 | 13.6 | 12.6 | 14.6 | 15.1 |
| BaO | 15.6 | 14.6 | 13.6 | 13.6 | 12.6 | 14.6 | 15.1 |

|  | 15 | 16 | 17 | 18 | 19 | 20 | 21 |
|---|---|---|---|---|---|---|---|
| $SiO_2$ | 54.5 | 55.5 | 56.5 | 54.5 | 54.5 | 54.5 | 55 |
| $AlO_{1.5}$ | 6.2 | 6.2 | 6.2 | 5.2 | 4.2 | 7.2 | 6.7 |
| $BO_{1.5}$ | 8 | 7 | 6 | 9 | 10 | 8 | 8 |
| CaO | 2 | — | — | — | — | 1 | 1 |
| SrO | 14.6 | 15.6 | 15.6 | 15.6 | 15.6 | 14.6 | 14.6 |
| BaO | 14.6 | 15.6 | 15.6 | 15.6 | 15.6 | 14.6 | 14.6 |

|  | 22 | 23 | 24 | 25 | 26 | 27 | 28 |
|---|---|---|---|---|---|---|---|
| $SiO_2$ | 54 | 54.5 | 54.5 | 54.5 | 54.5 | 54.5 | 54.5 |
| $AlO_{1.5}$ | 7.7 | 7.7 | 6.7 | 6.7 | 7.2 | 7.2 | 7.7 |
| $BO_{1.5}$ | 8 | 7.5 | 8.5 | 8 | 8 | 8 | 8 |
| CaO | 1 | 1 | 1 | 1 | 1.5 | 0.5 | 1 |
| SrO | 14.6 | 14.6 | 14.6 | 14.9 | 14.4 | 14.9 | 14.4 |
| BaO | 14.6 | 14.6 | 14.6 | 14.8 | 14.3 | 14.8 | 14.3 |

|  | 29 | 30 | 31 | 32 | 33 | 34 | 35 | 36 |
|---|---|---|---|---|---|---|---|---|
| $SiO_2$ | 54.5 | 54.5 | 54.5 | 54.5 | 54.5 | 54.5 | 54.5 | 54.5 |
| $AlO_{1.5}$ | 7.7 | 7.7 | 7.7 | 7.7 | 7.7 | 7.7 | 7.7 | 7.7 |
| $BO_{1.5}$ | 8 | 8 | 8 | 8 | 8 | 8 | 8 | 8 |

TABLE IA-continued

| | | | | | | | | |
|---|---|---|---|---|---|---|---|---|
| CaO | 0.5 | — | 1 | 1 | 1 | 1 | 0.5 | 0.5 |
| SrO | 14.4 | 14.4 | 13.4 | 12.4 | 10.4 | 8.4 | 13.4 | 12.4 |
| BaO | 14.8 | 15.3 | 15.3 | 16.3 | 18.3 | 20.3 | 15.8 | 16.8 |

As can be observed from Table I, each of the glasses reported therein exhibited a strain point higher than 600° C. and a linear coefficient of thermal expansion over the temperature range of 0°–300° C. higher than $70 \times 10^{-7}$/°C.

Table II below compares the physical properties of two selected glasses within the subject inventive compositions with a commercially marketed soda lime glass utilized as a substate in PDPs. Glass No. 39 and Glass No. 40 exhibit strain points approximately 120° C. higher than the soda lime glass, but actually melt at lower temperatures, and the forming temperatures of the two glasses, as indicated by Work, are within 10° C. of the soda lime glass. Both of the inventive glasses are also compatible with the float process from the perspective of resistance to devitrification, each having a liquidus viscosity greater than 300 MPas (3,000 poises).

Because glasses formed into sheet utilizing the float process customarily use halides, rather than arsenic, as fining agents, Glass No. 41 is a duplicate of Glass No. 40, but employing a combination of $BaCl_2 + BaF_2$ as the fining agent to yield 0.5% by weight Cl and 0.3% by weight F.

Table IA records the same glass compositions, but in terms of cation percent on the oxide basis.

TABLE II

| | 37 | 38 | 39 | Soda Lime |
|---|---|---|---|---|
| $SiO_2$ | 42.5 | 41.9 | 41.5 | 72.5 |
| $Al_2O_3$ | 5.09 | 4.69 | 4.66 | 2.0 |
| $B_2O_3$ | 3.61 | 3.56 | 3.53 | — |
| MgO | — | — | — | 4 |
| CaO | 0.728 | — | — | 8 |
| SrO | 19.3 | 20 | 19.8 | — |
| BaO | 28.5 | 29.6 | 29.4 | — |
| $Na_2O + K_2O$ | — | — | — | 13.5 |
| $As_2O_3$ | 1.1 | 1.1 | — | — |
| Cl | — | — | 0.5 | |
| F | — | — | 0.3 | |
| S.P. | — | 820 | 818 | 740 |
| A.P. | 669 | 673 | 667 | 554 |
| St.P. | 631 | 635 | 629 | 511 |
| Exp. | 78.9 | 79.9 | 79.9 | 85 |
| Den. | 2.49 | — | 3.475 | 3.469 |
| Liq. | — | 1020 | 1035 | — |
| Melt | 1261 | 1248 | — | 1358 |
| Work | 1032 | 1027 | — | 1036 |
| Liq.Vis. | 13533 | 8152 | — | — |

The preferred glass compositions exhibit strain points in excess of 625° C., linear coefficients of thermal expansion (0°–300° C.) between about $79–85 \times 10^{-7}$/°C., liquidus viscosities greater than 300 MPas (30500 poises), and consist essentially, expressed in terms of weight percent on the oxide basis, of

| | | | |
|---|---|---|---|
| $SiO_2$ | 40.0–43.0 | CaO | 0–1.5 |
| $Al_2O_3$ | 2.5–5.5 | SrO | 10.5–21.0 |
| $B_2O_3$ | 3.0–4.5 | BaO | 28.0–39 |
| MgO | 0–0.5 | MgO + CaO + SrO + BaO | 48.0–51.0 |

Glass No. 39 comprises the most preferred composition.

What is claimed is:

1. A glass exhibiting a strain point in excess of 600° C., a linear coefficient of thermal expansion over the temperature range of 0°–300° C. between about $70–90 \times 10^{-7}$/°C., a 1000 MPas isokom temperature below 1240° C., and a viscosity at the liquidus temperature greater than 300 MPas, said glass being essentially free from alkali metal oxides and consisting essentially, expressed in terms of weight percent on the oxide basis, of

| | | | |
|---|---|---|---|
| $SiO_2$ | 39–43 | CaO | 0–2.5 |
| $Al_2O_3$ | 2.5–9.5 | SrO | 10.5–21.5 |
| $B_2O_3$ | 1.5–4.5 | BaO | 25.5–39 |
| MgO | 0–1.5 | MgO + CaO + SrO + BaO | 45.5–52.5 |
| | | Fining Agents | 0–1.5. |

2. A glass according to claim 1 exhibiting a strain point in excess of 625° C., a linear coefficient of thermal expansion between about $79–85 \times 10^{-7}$/°C., and a viscosity at the liquidus temperature greater than 300 MPas, said glass consisting essentially of

| | | | |
|---|---|---|---|
| $SiO_2$ | 40.0–43.0 | CaO | 0–1.5 |
| $Al_2O_3$ | 2.5–5.5 | SrO | 10.5–21.0 |
| $B_2O_3$ | 3.0–4.5 | BaO | 28.0–39.0 |
| MgO | 0–0.5 | MgO + CaO + SrO + BaO | 48.0–51.0 |
| | | Fining Agents | 0–1.5. |

3. A glass substrate for use in a plasma display panel exhibiting a strain point in excess of 600° C., a linear coefficient of thermal expansion over the temperature range of 0°–300° C. between about $70–90 \times 10^{-7}$/°C., a 1000 MPas isokom temperature below 1240° C., and a viscosity at the liquidus temperature greater than 300 MPas, said glass being essentially free from alkali metal oxides and consisting essentially, expressed in terms of weight percent on the oxide basis, of

| | | | |
|---|---|---|---|
| $SiO_2$ | 39–43 | CaO | 0–2.5 |
| $Al_2O_3$ | 2.5–9.5 | SrO | 10.5–21.5 |
| $B_2O_3$ | 1.5–4.5 | BaO | 25.5–39 |
| MgO | 0–1.5 | MgO + CaO + SrO + BaO | 45.5–52.5 |
| | | Fining Agents | 0–1.5. |

4. A glass substrate according to claim 3 wherein said glass exhibits a strain point in excess of 625°, a linear coefficient of thermal expansion between about $79–85 \times 10^{-7}$/°C., and a viscosity at the liquidus temperature greater than 300 MPas, said glass consisting essentially of

| | | | |
|---|---|---|---|
| $SiO_2$ | 40.0–43.0 | CaO | 0–1.5 |
| $Al_2O_3$ | 2.5–5.5 | SrO | 10.5–21.0 |
| $B_2O_3$ | 3.0–4.5 | BaO | 21.0–39.0 |
| MgO | 0–0.5 | MgO + CaO + SrO + BaO | 48.0–51.0 |
| | | Fining Agents | 0–1.5. |

* * * * *